United States Patent [19]

Lesage et al.

[11] Patent Number: 5,372,624
[45] Date of Patent: Dec. 13, 1994

[54] PROCESS AND APPARATUS FOR BENDING A GLASS SHEET

[75] Inventors: Jean-Luc Lesage, Margny les Compiegne; Jean-Pierre Douche, Le Plessis Brion; Jean-Marc Petitcollin, Thourotte; Arnaud Borderiou, Compiegne; Marc Watin, Saint-Gobain, all of France

[73] Assignee: Saint-Gobain Vitrage International, Courbevoie, France

[21] Appl. No.: 909,081

[22] Filed: Jun. 29, 1992

[30] Foreign Application Priority Data

Jun. 27, 1991 [FR] France ................. 91 07933

[51] Int. Cl.$^5$ ........................................... C03B 23/03
[52] U.S. Cl. ........................................... 65/106; 65/273; 65/289
[58] Field of Search ............ 65/106, 25.4, 182.2, 65/273, 289

[56] References Cited

U.S. PATENT DOCUMENTS

| | | | |
|---|---|---|---|
| 3,573,889 | 4/1971 | McMaster et al. | 65/182.2 |
| 3,682,613 | 8/1972 | Johnson et al. | |
| 4,229,200 | 10/1980 | Seymour | |
| 4,596,592 | 6/1986 | Frank | |
| 4,612,031 | 9/1986 | Bennett et al. | |
| 4,781,745 | 11/1988 | Mumford | 65/273 |

FOREIGN PATENT DOCUMENTS

| | | |
|---|---|---|
| 0451010 | 10/1991 | European Pat. Off. |
| 2528819 | 12/1983 | France |
| 2400296 | 7/1974 | Germany |
| 1116130 | 6/1968 | United Kingdom |
| WO8910330 | 11/1989 | WIPO |

*Primary Examiner*—Joye L. Woodard
*Attorney, Agent, or Firm*—Oblon, Spivak, McClelland, Maier & Neustadt

[57] ABSTRACT

In a process and to an apparatus for bending a glass sheet heated to the bending temperature in a horizontal furnace, through which it is passed by a motor roller conveyor, which passes it into a bending cell where it is kept at an ambient temperature substantially identical to the bending temperature, the glass sheet is immobilized in the bending cell in an upper bending mold perpendicular to an annular countermold surrounding an element for supporting the central part of the glass sheet in the bending cell. The annular countermold is raised in order to press the glass sheet against the upper bending mold.

10 Claims, 4 Drawing Sheets

PROCESS AND APPARATUS FOR BENDING A GLASS SHEET

BACKGROUND OF THE INVENTION

1. Field of the Invention

The invention deals with methods for bending glass sheets and more particularly those having glass sheets moving in substantially horizontal planes and which have a pressing shaping phase. The invention more particularly applies to the industrial production of car glazings, such as bent and tempered glazings which are usually mounted to the rear and sides of vehicles, or bent glazings, or annealed, laminated glazings, i.e., those provided on one face with a plastic material sheet or assembled in pairs by means of a plastic material sheet and more particularly intended to serve as windscreens.

2. Description of the Related Art

Most car glazings are bent glazings which have to respect particularly severe optical quality standards and very accurately satisfy a predefined principal curvature, both on the edges, e.g., to permit the encapsulation of the glazing in a frame, and on the remainder of the surface because it may be necessary to pass the glazing into a narrow slot or to pair the glazing in order to form insulating double glazings.

Various apparatuses are known for the bending of a glass sheet in a horizontal position, involving pressing between two complementary bending molds, generally a solid mold and an annular countermold. All these apparatuses can be basically classified into two groups, which differ on the basis of the design of the bending station. In the first group, the station is merely located at the end of the furnace used for heating the glass sheets to beyond their softening point, all the bending tools being at ambient temperature with the exception of the parts in contact with the hot glass. The real advantage of this option is that it significantly simplifies the problem of the design of the tools, their setting and their replacement during production changes. However, this advantage is offset by the cooling of the glass throughout the bending operation due to the low temperature tools. Thus, the temperature of the glass, after bending, must generally be sufficiently high to allow thermal tempering. Moreover, the capacity of a glass to deform at a given speed is greatly dependent on its temperature. In addition, the more the glass cools, the less it is possible to bend it. This is especially prejudicial since this capacity for deforming is also inversely associated with the curvature already acquired, so that all the difficulties are accumulated at the end of the operation. Working outside the furnace therefore makes it necessary to overheat the glass sheets in the furnace, which increases optical deformation risks and combines the tooling problems with those associated with the glass and the respecting of its optical quality.

The second group of flat bending apparatuses consists of isothermal apparatuses, where the bending station is placed in a hot, sealed enclosure, where ambient temperature is close to the shaping temperature of the glass, i.e., between 600° and 750° C. Therefore, these apparatuses are also referred to by the term "bending apparatuses in the furnace", even if in reality bending takes place in a heated enclosure and not in the furnace. This option is advantageous with respect to the end product but not the tools used in its production. Thus, it is possible to bend glass sheets with much lower furnace exit temperatures than in the preceding case. It is no longer necessary to overheat the glass in order to compensate for heat losses during bending, which is favorable from an optical quality standpoint. Moreover, the thinness of the glass sheets or films, which is a limiting factor in the case of possible cooling during bending, is not as critical as previously.

However, this advantage is offset by a much more complicated design of the complete shaping apparatus, and in particular the tools. The first problem is that of the transfer of the glass sheet from the furnace to the bending press or, and this amounts to the same thing, that of its discharge, bearing in mind that the choice of a horizontal line is mainly dictated by the wish to avoid all grippers and other instruments acting in a localized manner and which consequently leave behind unremovable marks on the glazing.

A first solution is to supply the press with a suction plate performing a reciprocating movement between the end of the furnace and the press, the glass sheet being deposited on the lower mold, which is translated to a position itself facing the upper bending countermold (EP-A-183,418). However, the accuracy of bending requires a very high degree of control of these different lateral displacements, which at high temperature is difficult to obtain with a high regularity, particularly if an accuracy of approximately 1/10 mm is required, which is the case with the most complex glazing shapes.

Another solution is to extend the conveyor carrying the glass sheets up to the place where pressing takes place. In this case, it has been proposed to raise the glass sheet, e.g. by suction and upward hot gas flows, in order to bring it into contact with the upper mold, which is then raised, which leaves between the glass sheet supply conveyor and the upper mold a space which is sufficient to allow the introduction of a lower frame. After pressing by means of said frame, the glass sheet is again taken up by the upper mold until it is recovered by a tempering frame (EP-A-237,231). In the cold state, another possibility is to pass the lower pressing frame through the conveyor, either by the frame being formed by a series of segments between which can be located the conveyor rollers, or by the rollers having breaks providing a recess for the rest position for the pressing frame, or by the actual rollers being segmented. However, it should be noted that a segmented frame tends to promote the marking of the glass, the sheet not being uniformly supported over its periphery, while the two other variants, i.e., rollers with breaks or segmented rollers, cause enormous construction and design problems with respect to the roller drives, and these problems have not hitherto been solved for operations at high temperatures.

Finally, it is proposed in U.S. Pat. No. 3,869,271 that a shaping process based on vacuum be used, in which the glass is moved through the furnace by an air cushion and then penetrates the shaping zone outside the hot enclosure, where it is supported by a second air cushion surrounded by a pressing frame mounted in an overhanging manner and located just below an upper concave mold. The glass sheet is immobilized above the pressing frame lowered beneath the plane of the air cushion. The pressing frame is raised again and engages the glass sheet against the upper bending mold. To ensure that a large portion of the glass sheet is not without support during the transfer from the first air cushion to the air cushion of the shaping zone, in the interposed zone are provided roller sections for preventing any sag by gravity.

Here again, it must be stressed that the pressing device is in the cold zone. Moreover, in the aforementioned case, the glass sheet is supported in the pressing zone by an air cushion located within the pressing frame. In practice, such an arrangement is only possible if the dimensions of the planar glass sheet do not differ excessively from those of the frame, and therefore from the bent glass sheet, i.e. when the curvature imparted remains limited. In the opposite case, it is necessary to provide another air cushion surrounding the frame, which further complicates the problems of regulating or adjusting the tools, the balancing of the segmented air cushion being particularly difficult. Moreover, the checking of the trajectory of a moving glass sheet on a conveyor is difficult, because two glass sheets following one another can have trajectories which are several centimeters apart. These trajectory variations are difficult to reconcile with the combined requirements of high optical quality and great accuracy of the principal curvature. In order to compensate for these variations, it is admittedly possible to use a recentering member, such as is e.g. described in U.S. Pat. No. 4,233,049, but this further complicates the apparatus.

Moreover, this centering of the glass sheet is only advantageous if the two pressing molds coincide. However, in the aforementioned document, the annular countermold overhangs, whereas the upper mold is suspended. This leads to positioning variations which are difficult to compensate and which would be even more prejudicial if the tools were placed in the hot zone, even without taking account of the trivial, but real, difficulty that accessibility and visual checking are less difficult when the bonding zone is closed by side walls.

SUMMARY OF THE INVENTION

It is an object of the present invention to develop the technology of bending glass sheets by pressing in a hot zone with the aim of increasing the production rates and operating speeds with a reduction of production stoppage times, particularly those due to adjustments between two production changes, no matter what the complexity of the glazings and while respecting the aforementioned quality requirements.

According to the invention this object is achieved by a process for bending a glass sheet heated to the bending temperature in a horizontal furnace, which it traverses while carried by a motor roller conveyor which passes it into a bending cell where it is kept at an ambient temperature substantially identical to the bending temperature of the glass sheet. According to the invention the glass sheet is immobilized in the bending cell beneath an upper bending mold and perpendicular to an annular countermold surrounding a support means for the central part of the glass sheet in the bending cell, said annular countermold being raised to press the glass sheet against the upper bending mold.

The bending process according to the invention differs from the prior art processes firstly through the use in the hot shaping zone of a means for supporting the glass sheet, which merely supports it without conveying it. The glass sheet essentially continues its travel as a result of its inertia and the speed acquired on the roller conveyor. The support means can be constituted by freely rotating rollers, which are preferably mounted on air cushions, the actual rollers not being driven. Air cushion bearings can be suitable for this purpose and are e.g. described in patent application EP-A-310,300.

In a particularly preferred variant of the invention, the support means is an air cushion. Thus, in this case the absence of friction of the glass on the air cushion makes it possible to control the position of the glass sheet while it is still in contact with one of the rollers of the feed conveyor.

In a preferred manner, the glass sheets are oriented transversely and advance "point forward", i.e. in the case of a trapezoidal glazing with their large bases at the rear parallel to the feed conveyor rollers. In this way, the glass sheet can be "focused" by means of fixed lateral abutments or stops, or can be kept fixed throughout the centering operation. The air cushion enables the glass sheets to slide without friction and therefore without marking. Thus, it is sufficient for the glass sheets to engage between the two first lateral abutments, which are the farthest spaced apart because they correspond to the rear of the glazing, to enable the glass sheet to center itself.

The focusing of the glass sheet can, if appropriate, be completed by frontal abutments. In all cases, it is advantageous for there to be a slight downward inclination of the support means, so that the glass sheet is stopped in the extreme position and there is no tendency to move back slightly after it has impacted against the focusing abutments.

This glass sheet support means is surrounded by the annular countermold, which can therefore be constructed in the form of a continuous rail optionally provided with articulated members. The annular countermold is displaced from top to bottom and is located in a waiting position permitting the passage of the glass sheet and from bottom to top to press the latter and apply it against the upper bending mold.

The support means and annular countermold preferably constitute an assembly carried by a common support plate, which is installed outside the hot enclosure. Thus, they form a common assembly which can be replaced in one piece. The first advantage of such an arrangement is that it guarantees the perfect centering of the annular countermold relative to the air cushion. Moreover, the support plate also supports the entire motorization system, which can thus have parts considered to be fragile, such as electrical connections or compressed air intakes, mechanical precision devices, mechanical or hydraulic actuators, etc.

In a more particularly preferred embodiment of the invention the pressing assembly, namely the upper bending mold and the annular countermold, is closed and indexed during the temperature raising phases. This arrangement once again reduces the setting and adjusting times. Therefore the two molds are already placed correctly cold and remain so throughout the heating time.

Moreover, it is obvious that for retaining a good reproducibility of the shaping, said indexing is repeated during each pressing operation, which makes it possible to correct very small variations which might still occur.

The marginal zones of the glass sheet project over the air cushion and are consequently not supported. Usually this has no effect due to the absence of the cooling of the glass in the bending cell, there being no need to overheat the glass sheet in the furnace, which limits the tendency of the edges to sag. However, in the case of an exceptionally deep bending, this problem may become critical. In order to obviate it, it is possible to blow air in order to extend the action of the air cushion, e.g. using blowing ramps or banks mounted on the means supporting the annular countermold. It is optionally possible to use the same banks or others supplied with relatively high pressures, e.g. exceeding 80 mm water column so as to contribute to the taking up of the glass sheet by the upper bending mold.

The invention also relates to an apparatus permitting the performance of the aforementioned glass sheet bending process having a horizontal furnace terminated by a bending cell, in which is maintained a temperature close to the bending temperature of the glass sheet and having an upper bending mold provided with means for maintaining the glass sheet in contact with said upper bending mold and a lower assembly constituted by a means for supporting the central part of the glass sheet and an annular countermold surrounding said support means. Said countermold and said support means of the central part of the glass sheet are mounted on a support plate also carrying insulating members closing the bottom of the bending cell and various members placed outside the hot zone of the cell, and in particular annular countermold motorizing members. In such an installation, it is the entire lower part of the bending cell which is removed at each production change, so that the production line acquires the flexibility of a cold line, while maintaining the advantages of hot zone bending. As a result of the insulating members, it is possible to maintain beneath the line a sufficiently low temperature to permit safe human interventions.

In order to simplify production changes, it is preferable to install the entire lower assembly on a trolley or carriage, which is put into place by running on rails. This effect is reinforced when using said carriage for simultaneously supplying a new upper bending mold, which is then fixed to the suction unit in the manner of a slide valve.

The efficiency of the bending press is increased by a uniformity of the materials, the upper bending mold and the annular countermold being made from identical materials or materials which at least have identical expansion characteristics, which makes it possible to hot extrapolate the cold tool design and ensure a good parallelism of the bending press molds. These tools will, e.g., be obtained by casting and machining the same cast metal or refractory steel. The indexing systems or other parts forming part of the tool system, such as glass focusing abutments or stops, form a direct part of this set of tools from the casting stage, or are added with a very great machining accuracy. Moreover, the apparatus advantageously has means for measuring the gap between the upper bending mold and the annular countermold, jacks actuating the annular countermold being made dependent on said measuring means in order to bring about a perfect setting of the seating or positioning of the bending press.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
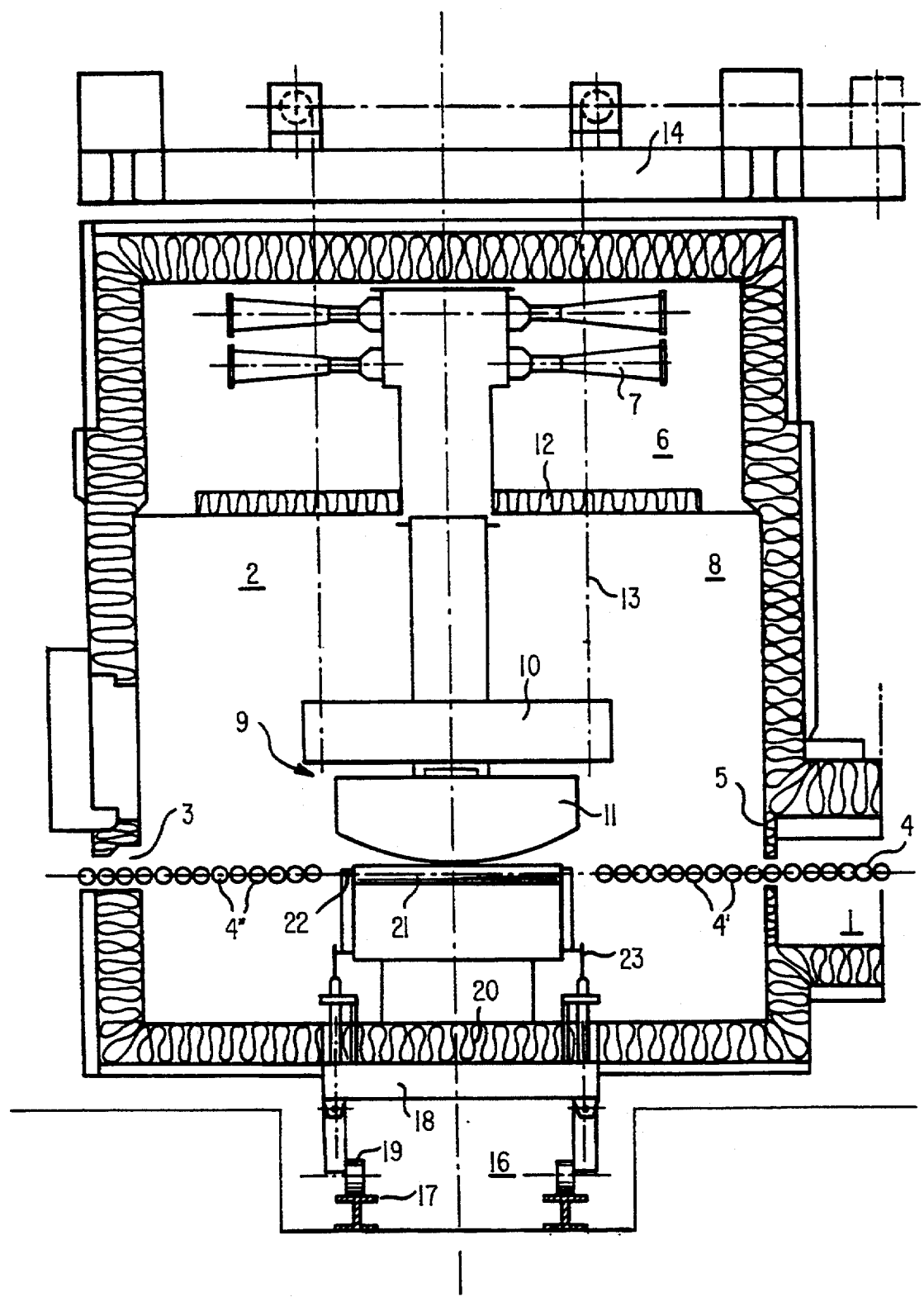
FIG. 1 is a side view of a bending mold according to the invention.
Figure 2:
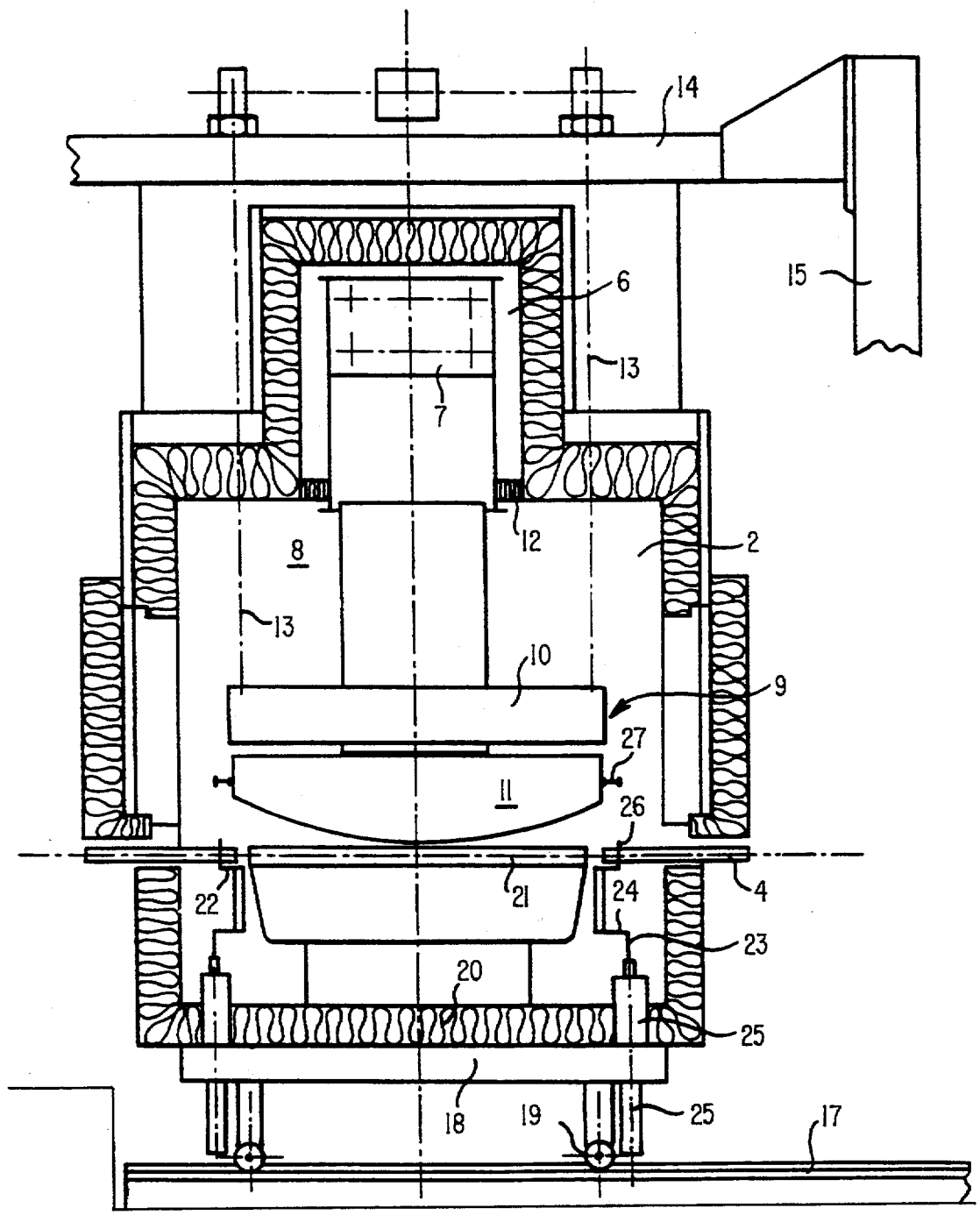
FIG. 2 the apparatus of FIG. 1 seen from the front.

The bending apparatus according to the invention shown in FIGS. 1 and 2 has, from right to left in FIG. 1, a furnace 1, whereof only the terminal end is shown, a bending cell 2 and an exit or outlet 3 in the direction of the cooling device. The furnace 1 is preferably an electric furnace having the characteristics described in European patent application 91.400450.2 filed on Feb. 20, 1991 in the name of the present Applicant or a furnace having means for heating the glass sheet to the bending temperature, optionally with localized overheated zones, e.g., corresponding to fold lines. The glass sheet is conveyed from said furnace by a plurality of motor rollers 4, e.g. made from silica or some other refractory ceramic. These rollers are preferably covered with a silica fabric sheath, which minimizes marking risks.

This conveyor is extended up to the bending cell (rollers 4'), which is a thermally insulated enclosure in which is maintained a temperature of roughly the same level as the bending temperature for the glass sheets and which is typically approximately 650° C. when a thermal tempering is provided at approximately 550° C. for a subsequent annealing. A curtain 3 is optionally used for avoiding parasitic air flows which might, e.g., be generated during charging operations. In the actual shaping zone, the conveyor is interrupted. However, further rollers 4" are located in the same alignment on the other side of said zone in order to permit the discharge, if appropriate, of an untreated sheet, the discharge of the latter being aided by a system of scrapers or brushes driving the defective sheets out of the area of the support member, e.g. towards a water break device.

The upper part of the bending cell is constituted by two thermally insulated zones. The narrowed upper zone 6 constitutes a suction zone, said suction being performed by pumps 7, the hot motor air coming from the reheating furnace for the glass sheets. The lower zone 8 contains the upper bending press assembly 9 essentially constituted by a tool holder 10 in which is located, between slides, a bottomless container 11 surrounding the upper bending mold 102. Suction by means of the pumps 7 makes it possible to place said container 11 under a vacuum, so as to create a suction force on the periphery of the glass sheet, this being preferred to that of a perforated suction mold because the force acting on the glass sheet is at a maximum close to the edges, i.e., where the bending of the glass takes place, and because there is no risk of marking the glass at the suction orifices and the peripheral suction gives a greater freedom with regards to the choice of the protective covering for the upper bending mold.

Figure 4:
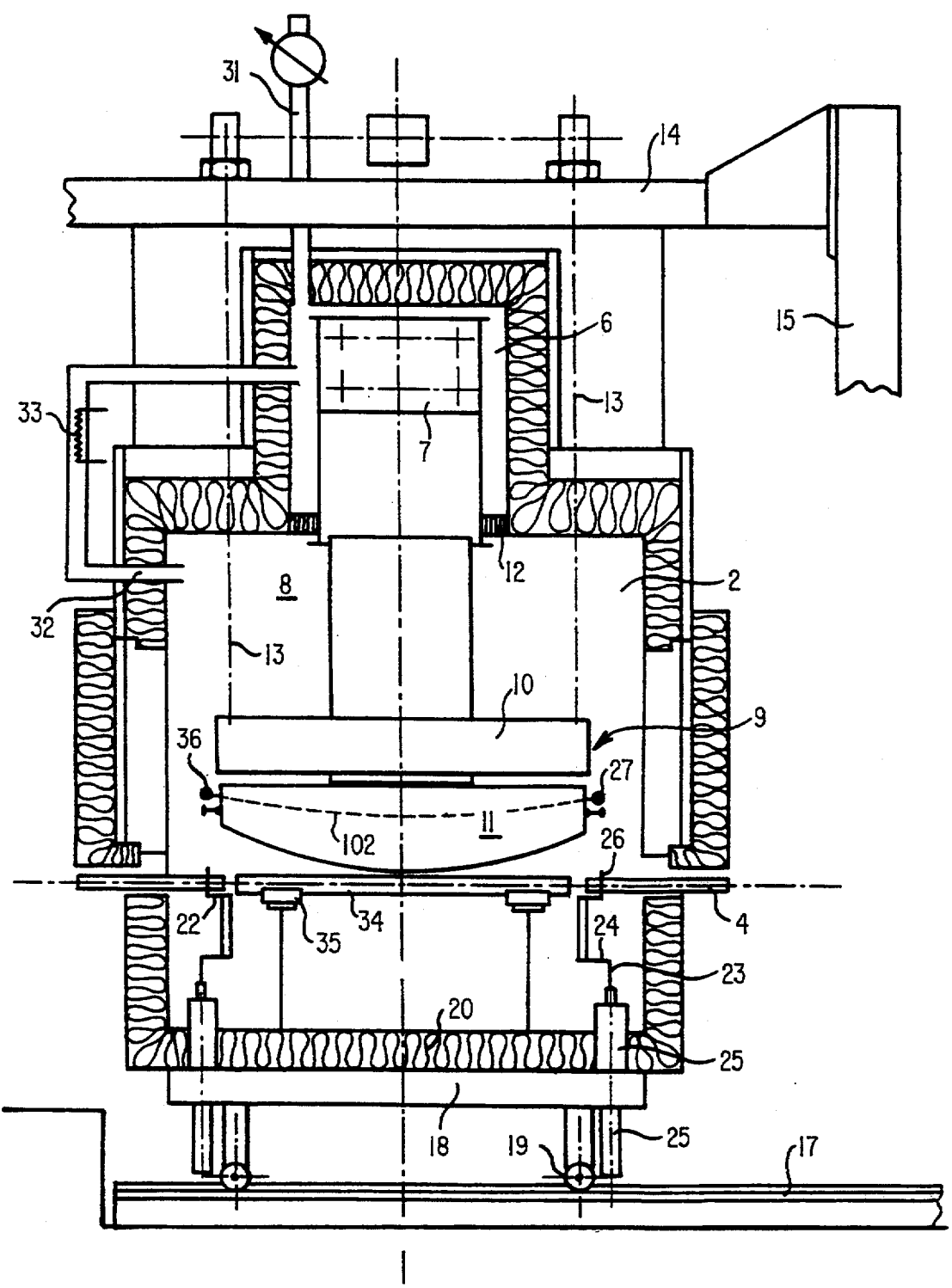
FIG. 4 is a front view similar to FIG. 2 but showing additional features.

The upper and lower zones separated by a thermal insulation wall 12 are connected by the suction pipe and also by at least one reinjection orifice 32 (FIG. 4) of at least part of the sucked air. At the time of said reinjection, the air is preferably reheated, e.g., by electrical resistors 33 or other equivalent heating means, in order to compensate for the cooling which occurs during expansion due to the suction and possibly for the somewhat "cold" temperature of the compressed air serving as the motor air for the pumps and preheated by a passage through a circuit in the furnace, so that the ambient temperature in the lower zone of the bending cell is perfectly temperature controlled. The upper zone also has a chimney 31 (FIG. 4) by which is possibly discharged the hot excess air from the furnace, so that it does not have to be under an over pressure in the upper zone and consequently permits a good regulation of the pressure in the suction zone. Moreover, the insulation of the lower zone reduces the size of the active part of the bending cell and thus simplifies temperature conditioning problems.

The upper part described hereinbefore also has a major advantage which is more particularly visible on the front view of the installation (FIG. 2), namely the members making it possible to manipulate the tool holder for carrying out upper mold raising-lowering operations can be positioned at the sides of the upper suction zone with cold air outside the cell. It should be noted that the high temperature of the shaping zone prevents the use of chains therein. Thus, the tool holder must be manipulated by tie rods 13, which are attached to chains, which wind onto pulleys, which must necessarily be positioned above the arch of the bending cell at a distance at least equal to the travel of the tie rods 13. In the invention, the positioning of the sides makes it possible to lower the beam 14 of the framework 13, which is only outlined in FIGS. 1 and 2, which reduces the costs of the apparatus and in particular its overall dimensions. This good temperature control and pressure control in the bending cell makes it unnecessary to compensate for cooling phenomena by convective currents by means of radiation heating devices, which overheat the tools and fabrics and therefore accelerate their aging.

It should be noted that such an upper part of the bending cell, can be used outside the specific scope of the present invention in all cases where an air return or suction mechanism is associated with an upper bending mold.

Details will now be given of the lower part of the bending cell, which overhangs a pit 16, at the bottom of which extend rails 17 arranged parallel to the rollers and by means of which the lower part of the bending press is put into place. The pit 16 is at a temperature close to ambient temperature even if the proximity to the bending cell leads to slight heating. Thus, the rails 17 remain cool, which ensures a simple, precise positioning of the lower part of the cell, which has a support plate 18 carried by a carriage or provided directly with wheels 19. This support plate 18 carries an insulating member 20, the support slab 21 for the air cushion and the annular countermold 22.

The insulating member 20 is fitted in and closes the bottom of the cell, which must be insulated for isothermal operation. When the lower assembly is withdrawn, the bottom is preferably closed again by a seal, e.g. of the (not shown) metal curtain or flap type, so as to prevent excessive heat losses. Moreover, sealing elements are provided at the junction between the insulating member and the fixed bottom of the bending cell.

The main component of the lower part of the press is the annular countermold 22 carried by a chassis 23, whose dimensions are advantageously calculated as a function of the maximum size of the glazings to be processed, a connecting plate 24 being used for fixing the countermold 22 to the chassis 23. The raising-lowering movements of the chassis 23 and therefore the countermold 22 are provided by at least three and preferably four motorized screws 25, which pass through the support plate 18 and therefore largely operate cold, which assures good operation. The motorized screws 25 also make it possible to regulate the seating or positioning of the annular countermold, during the adjustment phase and in particular during the pressing phase, as will be described in greater detail hereinafter. In the case shown here, the jacks are positioned below the bending cell and act directly on the annular frame.

The design of the tools and more particularly said annular frame must take place with a view to maximize bending precision and with, in particular, a very great reproducibility of the shapes of the glazings. For this purpose the inventors have adopted a goal of an accuracy of 1/10 mm for the glazings, which presupposes a greater accuracy for the tools.

Three types of faults can be caused by the annular frame, namely those due to insufficient concentricity, i.e., a displacement of the glazing in the horizontal plane with respect to the solid bending mold, those due to a poor parallelism of the tracks with a non-complementary mold and countermold, and finally those linked with positioning defects.

In a conventional installation, the annular frame is provided with regulating means making it possible to modify its track or path, its seating and its position in the plane. For this purpose, e.g., a certain number of screws are provided which, at the rear of the track, make it possible to modify the straightness of the latter. The annular frame is mounted on a concentric frame, which is itself mounted on another concentric frame which, by sets of screws and tie rods, makes it possible to regulate its concentricity and seating. Moreover, indexes are fitted and associated with the solid bending mold. In practice, there can be up to 100 regulating or setting points. For this purpose it is necessary to operate hot, the most widely adopted solution consisting of placing along the annular frame small piles of potter's clay and measuring the height of each of these piles after pressing. The operation is slow, being performed under high heat conditions, and it leads to relatively limited accuracy which is based on the experience of the operators. Once these settings have been performed, the aim of the operators is to remain as close as possible to the predetermined reference position, while attempting to successively reproduce the same operations. This aim is often unsuccessful in part and in all cases is inadequate for ensuring bending accuracies of better than 1 mm.

Within the scope of the invention, the first choice of the inventors was to eliminate all sheet metal working parts so as to only use molded and/or machined cast metal parts which have been thermally stabilized with respect to one another, namely a bending ring, upper mold and index made from the same material or materials having identical hot behavioral characteristics and with the same planes, based on computer assisted design for the annular frame and the bending mold. To the extent that the bending process according to the invention presupposes identical thermal conditions for all parts permanently placed on the thermally insulated enclosure of the bending cell, a guarantee is provided under these conditions of a perfect original parallelism of the tracks without requiring any further adjustment or setting. If the bending process provides for a cooling of the annular frame, particularly if the latter is used for transporting bent glass sheets out of the bending enclosure and more particularly is used for supporting glass sheets during tempering, preference is given to the choice of different materials but which, each in its respective working temperature range, behaves in an identical manner.

As indicated hereinbefore, the indexing systems form an integral part of the tool systems and will have the same hot behavior. Their setting and therefore the concentricity of the annular frame relative to the upper bending mold can thus take place cold, on a once and forever basis.

The final setting mentioned above relates to the seating. In the prior art installations, it related solely to the annular frame. However, in actual fact it should be noted that the upper mold is suspended on tie rods and certain of these can be lengthened compared with the others, so that despite the very high weight, the seating of the upper bending mold can be modified, so that even a perfect setting of the seating of the annular frame leads to an unsatisfactory result.

According to a preferred variant of the invention, the aim is not to regulate the seating or position of the countermold and/or the mold relative to an absolute position, and in particular the horizontal, and instead to impose a precise gap between the countermold and the mold. For this purpose use is made of at least three and preferably four jacks or other independent lifting means, whose movements are dependent on transducers 36 in the final approach phase.

These transducers 36 can, e.g., be magnetorestrictive transducers, whose rod is protected. Optical triangulation is also possible. However, preference is given to the use of capacitive transducers made from stainless steel and which then use the upper metal mold as a reflector. Such capacitive transducers can advantageously operate without any protection of the cooling circuit type and the accuracy of their measurement is very great and up to approximately 10 mm, so that they consequently have a maximum sensitivity in the range of the invention.

Preferably, the means controlling the displacements of the annular countermold do not act directly on the latter, but instead on the frame-like chassis supporting it. These means are, e.g., of the jack type or preferably the motorized screw type. This frame is preferably a non-deformable frame, i.e., it cannot be modified by the settings. The lateral arms preferably traverse the straight feet of the bending cell by appropriate slots, which makes it possible to position the jacks cold, which simplifies the maintenance operations. The annular countermold is not rigidly fixed thereon, but, e.g., rests on fingers engaged in hollows of the annular frame. Thus, the annular frame has a certain degree of freedom with respect to the support frame and if the jacks are not precisely at the same height, the annular frame will not be deformed. It should be noted that in this case it is not perpendicular, but this seating deficiency is corrected by the gap control.

In order to ensure that the annular frame placed on the support frame does not fall in such a case of unbalance, it is advantageously provided with angle irons, which limit the lateral displacement and assist the putting into place of the annular frame on its support.

With respect to the displacement of the motorized screws, at the end of the travel each of them is independent and is controlled by the measurement of the gap. With regards to the remainder of their travel, which can, e.g., be 200 to 300 mm, whereas the end of travel represents a displacement of only 10 mm, the motorized screws are preferably synchronously displaced. For this purpose, it is advantageous to provide independent mechanical systems, which are in any case necessary for the end of travel, but whose procedures are supervised. According to a known electrically controlled synchronization method, use is, e.g., made of one screw as the leader end and the displacement of the other screws will be adjusted with respect thereto. This synchronization method makes it possible to have high speed displacements, knowing that in this part of the travel no greater accuracy is necessary and variations of a few millimeters are permitted. As soon as one of the gap transducers measures a distance below the chosen threshold, e.g., 190 mm, the motorized screw displacements are desynchronized in favor of a gap-controlled mode.

As can be gathered from the above description, within the scope of the invention, no attempt is made to obtain exact, reproducible movements, but a correct final position is guaranteed.

The design of the tools described hereinbefore and more particularly the gap control principle can be applied to other bending installations, provided that the annular countermold is not deformable, so that the position measured by the gap transducers 36 effectively indicates the position of all the points of the track of the annular countermold. Moreover, a stationary upper bending mold is assumed with a vertical displacement of the annular frame in order to press the glass sheet. However, the invention is also applicable to installations with an annular frame which is not vertically displaced, but where the upper bending mold is lowered, or to installations where the two components of the press are moved together.

The annular countermold 22 is preferably constituted by a continuous rail, which limits the risks of marking the glass surface, but can also be formed by three members which are articulated together for solving the most complex bending problems. On the countermold are installed indexing fingers 26 which engage in slots or eyelets 27 associated with the upper mold of the bending press. The upper mold, the countermold and the indexing members are all made from the same material, or at least from materials having the same heat behavioral characteristics. Use is, e.g., made of refractory cast steel, the parts being straightened after molding. Moreover, it should be noted that all the parts intended to come into contact with the glass sheet are preferably provided with a protective covering, e.g., one based on knitted or woven metal fibers.

Therefore the bending press is formed from two molds, whereof the parallelism of the tracks is ensured by the machining of the parts and identical expansion characteristics, the seating of the press being controlled by gap dependence.

The third element carried by the support plate 18 is the air cushion or more precisely the support slab 21. The air cushion is placed within the annular countermold and supports the glass in the shaping zone. The support slab, e.g., constituted by a perforated ceramic plate having blowing orifices, is directly supported by the support plate, fine regulating means making it possible to regulate its seating and its slight downward slope for ensuring its position of focusing the glass on abutments.

This air cushion is a hot, preheated fan-blown air cushion, bearing in mind flow rates of several thousand cubic meters per hour which are required and pressures of hundreds of millimeters of water column necessary for maintaining the cushion. Placed only in the center of the countermold and carried by a support plate, the air cushion can easily be regulated so as to tangent the roller conveyor during the taking up of the glass sheets. For this regulation of the air cushion, use is made of, e.g., a non-deformable beam, e.g., one made from a ceramic material which rests both on the rollers 4' upstream of the shaping zone and on the rollers 4" downstream thereof. On said beam are mounted spacing transducers, e.g., of the same type as used for measuring the gap and which will be used for regulating the height of the air cushion and its horizontality. The air cushion generally only serves to support the glass sheet whose movement is controlled by the contact of its rear part with the rollers. In practice, this control is perfectly effective when the glass is in contact with at least one roller, the air cushion virtually not slowing down the glass. Nevertheless, it may be necessary to provide means for aiding the advance of the glass sheet, such as a hot air blowing on the edge, a bias orientation of certain of the orifices of the support slab or a slight gradient of the air cushion.

It must be stressed that in the case of the invention, the single air cushion in the shaping zone avoids numerous disadvantages associated with the use of air cushions. Firstly, it is possible in the furnace to carry out a differentiated heating of the lower face of the glass sheet, because then the latter is supported by the rollers. In addition, the trajectory of the glass sheet 28 (cf. FIG. 3) is controlled in a more satisfactory manner with rollers.

Figure 3:
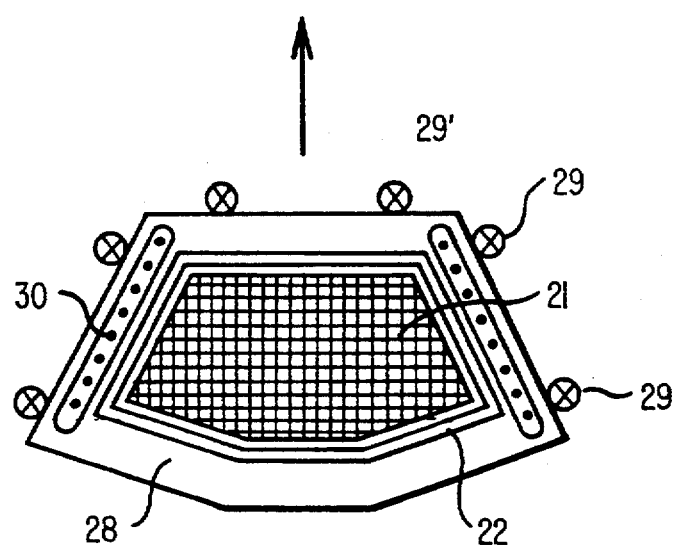
FIG. 3 a plan view of a glass sheet centered above an annular countermold according to the invention.

As a result of said air cushion in the shaping zone and the focusing abutments, it is easily possible to make good all the trajectory variations of a few millimeters due to the furnace rollers. These lateral and frontal focusing abutments 29 and 29' are made integral with the upper bending mold or with reference to the latter. Thus, if, as shown in FIG. 3, the glass sheet advances "point forwards", it is sufficient that any lateral displacement thereof does not prevent it from engaging between the focusing abutments to ensure that a perfect centering is finally obtained (this generally allowing a displacement of several centimeters, which is perfectly adequate). The glass, still in contact with at least one roller 4 ensuring the movement of the sheet, will slide laterally on the air cushion without any risk of damage.

With such an apparatus, the positioning of the glass sheet is completely independent of the air cushion, which merely supports the glass. However, the glass sheet and the upper bending mold perfectly coincide, even if the upper bending mold is displaced with respect to its reference position.

The second aspect is the bringing into reference of the two pressing members, which is obtained by the choice and quality of the materials, the indexing of the upper bending mold relative to the annular countermold and making the jacks moving the countermold dependent on the gap. Thus, the apparatus is designed so as to limit all positioning variations and the latter are corrected in a complete manner during each operation.

FIG. 3 shows an apparatus for compensating for any sag of the peripheral part of the glass sheet not supported by the air cushion. In this case, the annular countermold is duplicated by an air blowing bank 30 heated to a temperature close to that of the sheet or even overheated, if said peripheral part has to undergo a particularly great bending.

The same installation is often required to deal with glazings having widely varying dimensions. Nevertheless, the same chassis or frame 23 is preferably needed for all dimensions, said frame carrying conveyor rollers driven in a synchronous manner with respect to the fixed rollers of the conveyor traversing the furnace and said rollers preferably have regulatable distances between the centers in order to adapt to different individual cases.

It should also be noted that the support plate is preferably motorized, which permits the rapid extraction of the bottom part of the bending press, e.g., for cleaning, if a glass sheet breaks. This extraction can be synchronized with the putting into place of a water break means, which is, e.g., substituted for the rollers installed level with the bending cell threshold, the water break means being located in a pit and is raised at the desired moment. Therefore an accidental breakage only leads to the loss of a few blazing and production is not interrupted.

The installation functions in the following way. The lower part of the bending press is supplied on the rails 17, and is locked in accordance with a reference position. After the connection of the hot air intakes and optionally electric power supplies, the upper mold is brought onto the countermold and maintained in the indexed position throughout a temperature rise phase, so that the press is in the closed position. This position is maintained throughout the temperature rise phase of the different components. When the preheating of the installation is ended, the bending cycle can commence and the press is opened, the annular countermold being lowered below the glass sheet conveying level. As soon as the arrival of a glass sheet is detected, e.g., by a transducer whose cold calculating devices are preferably also carried by the support plate, the upper bending mold is lowered at a fast speed in the initial stage and then at a slower speed. The glass sheet can thus be focused with respect to the abutments of said mold. The focusing abutments are optionally retracted during the starting of the peripheral suction for raising the glass sheet. Therefore the glass sheet is preshaped in contact with the upper bending mold. The countermold is then raised to the pressing position, initially with the four jacks actuated synchronously and then in the final phase with the four independent jacks dependent on the real gap between the mould and the countermold. When pressing is at an end, the glass sheet is held by suction against the upper bending mold, which is then raised into the upper position. A transfer frame or any similar means then takes up the bent glass sheet to bring it to the cooling station.

As an alternative to the air cushion, the support means can be comprised of freely rotating rollers 34 (FIG. 4) carried by air bearings 35.

The bending process and apparatus described hereinbefore allow particularly short cycle times with production changes taking place very rapidly and with very short regulating and adjustment times and the quality of the volumes produced is only subject to very minor variations.

What is claimed as new and desired to be secured by Letters Patent of the United States is:

1. Process for bending a glass sheet heated to the bending temperature in a horizontal furnace, comprising the steps of:
   passing the glass sheet through the furnace on a motor roller conveyor,
   introducing the heated glass sheet from the furnace into a bending cell, maintaining the heated glass sheet in the bending cell at an ambient temperature substantially identical to the glass sheet bending temperature, immobilizing the glass sheet in the bending cell under an upper bending mold above an annular countermold surrounding freely rotating conveyors for supporting the central part of the glass sheet in the bending cell, and raising the annular countermold to press the glass sheet against the upper bending mold.

2. Process according to claim 1 wherein the annular countermold and the support means are mounted on a support plate.

3. Bending process according to claim 1 including the step of displacing the glass sheet in the furnace in a direction perpendicular to a large side thereof.

4. Bending process according to claim 1 wherein said support means are inclined.

5. Apparatus for bending a glass sheet, comprising:

a horizontal furnace;

a bending cell adjacent the furnace, means in the bending cell for maintaining therein a temperature close to the bending temperature of the glass sheet including an upper bending mold associated with a suction device installed in the bending cell, and a thermal insulation wall separating the bending cell into a suction zone and a lower zone in which is located the upper bending mold.

6. Apparatus according to claim 5 wherein the suction zone has a width smaller than that of the lower zone of the bending cell.

7. Apparatus according to claim 5 including a chimney communicating with said suction zone.

8. Apparatus according to claim 7 including reinjection means having an orifice for reinjecting air sucked by said suction device back into said lower zone.

9. Apparatus according to claim 8 including means for heating the reinjected air.

10. Process for bending a glass sheet heated to the bending temperature in a horizontal furnace, comprising the steps of:

passing the glass sheet through the furnace on a motor roller conveyor, introducing the heated glass sheet from the furnace into a bending cell, maintaining the heated glass sheet in the bending cell at an ambient temperature substantially identical to the glass sheet bending temperature, immobilizing the glass sheet in the bending cell under an upper bending mold above an annular countermold surrounding a support plate for supporting the central part of the glass sheet in the bending cell, raising the annular countermold to press the glass sheet against the upper bending mold, and rapidly extracting the support plate from the bending cell.

* * * * *